United States Patent

[11] 3,609,113

[72] Inventors Gerhard Schade
Witten-Bommern;
Franz Blaschke, Witten-Ruhr, both of Germany
[21] Appl. No. 813,761
[22] Filed Apr. 4, 1969
[45] Patented Sept. 28, 1971
[73] Assignee Dynamit Nobel Aktiengesellschaft
Witten-Ruhu, Germany
[32] Priority Apr. 6, 1968
[33] Germany
[31] P 17 70 146.1

[54] POLY-(ARYLENE-TRIKETOIMIDAZOLIDINES AND PROCESS FOR PREPARING THE SAME
19 Claims, No Drawings
[52] U.S. Cl.................................................. 260/30.2,
260/32.6 N, 260/33.4, 260/77.5, 260/326,
260/857, 260/858, 260/860
[51] Int. Cl........................................................C08g 22/08,
C08g 51/34, C08g 51/44
[50] Field of Search............................................ 260/78 TF,
78, 326 N, 77.5, 857, 858, 860

*Primary Examiner*—Morris Liebman
*Assistant Examiner*—Richard Zaitlen
*Attorney*—Craig, Antonelli, Stewart & Hill

ABSTRACT: Poly-(arylene-triketoimidazolidines) are prepared by reacting approximately diamine amounts of bis-(oxalic acid-monoalkyl ester-monoamide) of an aromatic diamine with an aromatic diisocyanate in a polar organic solvent at an elevated temperature. The polymers melt at about 310° C. up to > 400° C. with decomposition. Organic solvent solutions thereof can be used for the production of high-temperature resistant films and fibers as well as coatings for metals. Wire insulating varnishes can also be prepared therefrom.

POLY-(ARYLENE-TRIKETOIMIDAZOLIDINES) AND PROCESS FOR PREPARING THE SAME

BACKGROUND OF THE INVENTION

This invention relates to a process for the preparation of poly-(arylene-triketoimidazolidines) having the general formula:

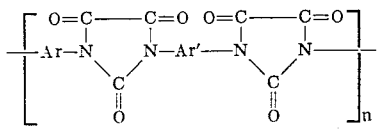

wherein Ar and Ar' represent identical or different arylene residues and $n$ is a positive integer. More particularly, it relates to a process for the preparation of said polymers from aromatic diisocyanates and bis-(oxalic acid-monoalkyl ester-monamides) of aromatic diamines.

Polymers containing the ring system of the triketoimidazolidine as a component of the polymer chain have not been described heretofore. As discovered in accordance with the invention these polymers are products which melt at about 310° C. up to >400° C. with decomposition and are soluble in many cases to a practically unlimited extent in polar solvents, such as cresol and xylenol mixtures, N-methylpyrrolidone, dimethylformamide, dimethylacetamide, dimethyl sulfoxide and the like. Consequently, they can be employed for the production of high-temperature resistant films, fibers and foils, as well as for adhesive, elastic coatings on metals. Because of their solubility in cresol, they can also be advantageously employed in combination with wire insulating varnish resins which contain condensed therein, in a conventional manner, residues of terephtalalic or isophthalic acid and of ethylene glycol and polyfunctional alcohols, such as glycerin or pentaerythritol. By appropriately blending cresolic solutions of these conventional wire insulating varnish resins with cresolic solutions of the poly-(arylene-triketoimidazolidines), wire insulating varnishes can be manufactured in an economical manner which result in wire insulations having considerably improved property vales.

One of the objects of the present invention is to provide a process for the preparation of poly-(arylene-triketoimidazolidines).

Another object of the present invention is to provide a process for producing said polymers which may be carried out in an efficacious and economically feasible manner.

A further object of the invention is to provide poly-(arylene-triketoimidazolidines) useful in the production of high-temperature resistant films, fibers and foils, of adhesive and elastic coatings on metals and of wire insulating varnishes.

A still further object of the invention is to provide novel polymers containing the triketoimidazolidine ring system as a component of the polymer chain.

These and other objects and advantages of the present invention will become apparent to those skilled in the art from a consideration of the following specification and claims.

SUMMARY OF THE INVENTION

In accordance with the present invention, a bis-(oxalic acid monoalkyl ester monoamide) of an aromatic diamine is reacted with practically equimolar amounts of an aromatic diisocyanate in a polar solvent at an elevated temperature, with the alkanol being split off, to give the described poly-(arylene-triketoimidazolidines).

The bis-(oxalic acid-monoalkyl ester-monoamides) of aromatic diamines to be employed in the present invention can be obtained readily and in a practically quantitative yield in accordance with an already described process for the production of oxanilic acid (the N-phenyl-monoamide of oxalic acid) esters, by H. Klinger in *Liebig's Annalen*, Vol. 184, p. 263 (1877), by heating an aromatic diamine with excess amounts of a dialkyl oxalate, with the stoichiometric quantity of alkanol being cleaved or split off.

Aromatic diamines which are especially suitable for obtaining said monoamide starting material are the following:
4,4'-diaminodiphenylmethane
3,3'-diaminodiphenylmethane
4,4'-diaminodiphenyl oxide
4,4'-diaminodiphenyl sulfone
1,5-diaminonaphthalene
p-phenylenediamine In this connection, these amines can optionally also be alkyl-substituted on the aromatic nuclei. It was found that only those diamines which have their amino groups on two different benzene rings, or those which have their amino groups in the p-position on only one benzene ring, can be employed in the described reaction, i.e., o- and m-diaminobenzenes cannot be used.

Suitable dialky oxalates to be utilized include the oxalic acid esters of all those alcohols that boil at temperatures of below about 130° C. The complete removal of the alcohols by distillation under the manufacturing conditions used for the bis-(oxalic acid-monoester-monoamides) is necessary, especially when it is intended not to purify these products by a recrystallization, since the presence of these alcohols can interfere with the subsequent reaction with diisocyanates because of the formation of urethanes. On account of its ready availability and particularly good reactivity, diethyl oxalate is preferred.

The solvents to be employed in the reaction of the invention should boil at least above approximately 180° C. and should be inert with respect to the isocyanates. For practical considerations, N-methylpyrrolidone and cresol are especially suitable. The latter solvent forms the corresponding cresyl urethane with isocyanates, but these urethanes dissociate again to cresol and the isocyanate at the maximum permissible reaction temperature, which latter must range below the decomposition temperature of the bis-(oxalic acid-monoalkyl ester-monoamides), i.e., generally at about 210°–215° C. Consequently, the use of cresol does not impair the polyreaction, but rather merely slows it down. This disadvantage is counterbalanced by far by the fact that this solvent is inexpensive and that the directly obtainable cresol solutions can be employed for many purposes. The solvent must, however, be as extensively anhydrous as possible in order to exclude side reactions with the diisocyanates.

Suitable aromatic diisocyanates to be employed in the reaction of the invention are the following:
2,4-and 2,6-diisocyanatotoluene
4,4'-diisocyanatodiphenylmethane
1,4-diisocyanatobenzene
1,5-diisocyanatonaphthalene
and similar products.

The fact that the polymers prepared in accordance with this invention are poly-(arylene-triketoimidazolidines) was determined with certainty by a comparison of the IR-spectra of diphenyl-triketoimidazolidine, produced on the one hand in accordance with the process of H. Biltz and E. Topp as well as, on the other hand, from oxanilic acid ethyl ester and phenylisocyanate in cresol (under conditions maintained in accordance with the invention), with the IR-spectra of the corresponding polymers.

The reaction of the invention proceeds as follows:

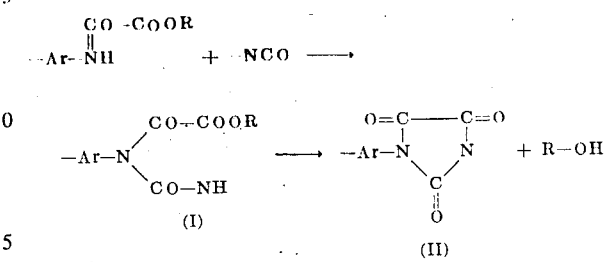

In this connection, the substituted polyurea (I) cannot be isolated; it is converted at the moment of its formation in the nascent state into the cyclization (II), with the corresponding alkanol being split off. Therefore, the commencement of the polycondensation with the diisocyanate can be detected in a simple manner by the onset of this alkanol cleavage reaction. The minimum reaction temperature to be employed with N-methylpyrrolidone solvent is about 160°–170° C. and in cresol—because of the preceding thermal decomposition of cresyl urethane—about 190°–195° C. In contrast thereto, the limit of thermal stability of the bis-(oxalic acid-monoalkyl ester-monoamides) of the aromatic diamines, except for the M- and o-diaminobenzenes, is at least 220° C. In order to obtain high molecular weight polymers, the reaction of the starting materials utilized in this connection is to be conducted at temperatures between the respective critical temperatures of 160°–170° C. and 190°–195° C., on the one hand, and the respective decomposition point of the bis-(oxalic acid-monoalkyl ester-monamide) employed, on the other hand.

The process of this invention exhibits the advantage that the conversion of the dialkyl oxalates with the aromatic diamines to form bis-(oxalic acid monoester-monoamides), as well as the polyreaction of these intermediates with diisocyanates can be conducted practically quantitatively and without obtaining any nondistillable byproducts or cleavage products. Expensive additional operations, such as filtering or centrifuging off of any solid components, recrystallizing of any preliminary products and similar process steps, can be avoided in the normal case, even when starting directly with dialkyl oxalates, diamines and diisocyanates. The final product, in the normal case, is a homogeneous solution of the polymer which can be further processed immediately as desired.

In order to obtain high molecular weights with certainty, it is suitable in many cases to employ a small excess of diisocyanate, whereby polymers are obtained having isocyanate end groups. These polymers can thereafter be reacted for the purpose of chain lengthening with water, diamines or the like in a conventional manner.

EXAMPLES OF THE INVENTION

The following examples are given merely as illustrative of the present invention and are not to be considered as limiting.

EXAMPLE 1

Three hundred and ninety-six g. of 4,40'-diaminodiphenylmethane (2 moles) is agitated with 1,460 g. of diethyl oxalate (10 moles) under an atmosphere of pure nitrogen the temperature being maintained at 135°–145° C. After 2 hours, 184 g. of ethanol (4 moles) is distilled off. Thereafter, the temperature is increased to 200° C., and the excess diethyl oxalate is distilled off. After the termination of the distilling step, a weak vacuum is applied for another 10 minutes in order to safely remove the last traces of ethanol and diethyl oxalate.

Then, 500 ml. of anhydrous cresol is added to the melt of the thus-obtained bis-(oxalic acid-monoethyl ester-monoamide) of diaminodiphenylmethane, and 515 g. of 4,4°-diisocyanatodiphenylmethane (2 moles+3 molar percent) is introduced into the solution. The reaction mixture is stirred for 24 hours at temperatures of between 200° and 210° C., whereupon the cleavage of ethanol is terminated. In view of the increasing viscosity of the reaction mixture, additional anhydrous cresol is continuously added during the course of this reaction, so that, at the end, a total of 2,600 g. of this solvent is present, containing 1,119 g. of the polymer. The concentration of the solution is 30 percent by weight. The solution itself solidifies after cooling to a rigid, clear mass of a dark-brown color. From one portion of the mass, the polymer is precipitated and isolated by stirring and mixing with ethanol. The relative viscosity of the product is 1.65, as determined in phenol-1,1,2,2-tetrachloroethane (60:40 percent by weight) by means of a capillary viscosimeter at 25° C., the solution containing 1 g. of polymer in 100 ml. of solvent. The relative viscosity is the quotient of the passage times of the solution and of the solvent in the capillary viscosimeter.

The thermal oxidation resistance of the polymer is determined by means of differential thermocalorimetry (using a Perkin-Elmer DSC-1 differential thermocalorimeter) at a heating rate of 16.8° and 4° C./min. in air. Independently of the heating rate, the first indications of an exothermic decomposition reaction are found at 394°–398° C.

Up to the point of decomposition, no thermal effects at all can be observed which would lead to the conclusion that there is a vitrification point or any crystallization phenomena.

Films cast from dimethylformamide solutions of the polymer are too brittle for practical usability, because the molecular weight of the polymer is too low.

The cresol solution of the polymer containing 30 percent by weight of solid substance is mixed with a wire insulating varnish of the following composition, in a weight ratio of 1:1:

35 parts by weight of an ester resin in accordance with Belgian Pat. No. 543,486 (containing 2 moles of terephthalic acid residue, 1 mole of glycerin residue and 1.3 of ethylene glycol residue)
50 parts by weight of cresol
10 parts by weight of xylene
5 by weight of ethylene glycol
1.4 by weight of a cresol solution containing 50 percent by weight of polymeric butyl titanate The resultant mixture is further diluted with cresol to the viscosity of the ester resin wire varnish.

The mixture of the ester resin wire varnish with the polymer solution is baked at 450° C. onto a copper wire having a thickness of 0.6 mm. For comparison purposes, the same is done with the unmixed ester resin wire varnish.

When compared with the pure ester resin varnish coating, the varnish coating with the ester resin-polymer mixture exhibits H following differences:

The surface hardness (in accordance with DIN 46,453, Draft of Apr. 1965) rises from 3 H to 6 H.

The abrasion resistance (in accordance with NEMA/MW 55–1955) increases (depending on the operating speed) from 40–100 to 150–180 double strokes. The elasticity and heat aging stability are unchanged and remain satisfactory. The heat shock resistance (Locke 1×Φ, 200 load, coiling speed 280 r.p.m., testing period 15 min.) rises from 180° C. to 260° C. and even up to 400° C.

The heat pressure stability according to DIN (German Industrial Standard) 46,453, Draft of Dec. 1961 (800 g. load) rises from 250–280 to 275–300. The optimum varnishing rate rises from 7–9 m./min. to 10–12 m./min.

EXAMPLE 2

Example 1 is repeated, with the difference that a few drops of water are added to the polymer solution which still contains terminal isocyanate groups, at about 200° C., whereby a chain lengthening is achieved by way of urea bridges. The reaction mixture is agitated for another hour in the presence of the water, which is maintained under reflux. The product precipitated thereafter has a relative viscosity of 2.1 Differential thermocalorimetry does not show any differences with respect to the product obtained in accordance with example 1.

EXAMPLE 3

Example 2 is repeated, with the difference that N-methylpyrrolidone is employed in place of the cresol. The polymer exhibits a relative viscosity of 2.05 and can be processed into flexible cast foil.

EXAMPLE 4

Example 1 is repeated, with the use of the following starting materials, N-methylpyrrolidone being employed as the solvent:

a. Diaminodiphenl oxide and 1,5-diisocyanatonaphthalene; decomposition point of the resulting polymer: >400° C.
b. Diaminodiphenylmethane and tolylene diisocyanate (mixture of isomers); decomposition point of the resulting polymer: 310° C.
c. Diaminodiphenylsulfone and 2,4-toluylene diisocyanate; decomposition point of the resulting polymer: 325° C.
d. Diaminodiphenylmethane-p-phenylenediamine mixture (molar ratio 1:1) and 4,4'-diisocyanatodiphenylmethane; decomposition point of the resulting polymer: 400° C.

Each of the polymer products obtained has properties which enable their use in the various applications described hereinabove.

The invention being thus described, it will be obvious that the same may be varied in many ways. Such variations are not to be regarded as a departure from the spirit and scope of the invention and all such modifications as would be obvious to one skilled in the art are intended to be included herein.

We claim:

1. A poly-(arylene-triketoimidazolidine) having the general formula:

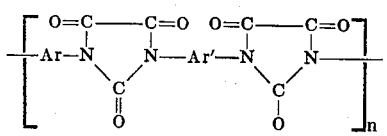

wherein Ar is an arylene group selected from the group consisting of unsubstituted and alkyl-substituted 4,4'-diphenylmethane; 3,3'-diphenylmethane; 4,4'-diphenyl oxide; 4,4'-diphenyl sulfone; 1,5-naphthalene; and p-phenylene, Ar' is selected from the same group as Ar and m-phenylene, and n is a positive integer.

2. An inert polar organic solvent solution of a poly-(arylene-triketoimidazolidine) having the general formula:

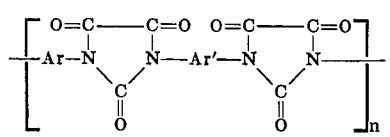

wherein Ar is an arylene group selected from the group consisting of unsubstituted and alkyl-substituted 4, 4'-diphenylmethane; 3, 3'-diphenylmethane; 4, 4'-diphenyl oxide; 4, 4'-diphenyl sulfone; 1, 5-naphthalene; and p-phenylene, Ar' is selected from the same group as Ar and m-phenylene, and n is a positive integer.

3. The organic solvent solution of claim 2, wherein said polar solvent is cresol.

4. The organic solvent solution of claim 2, wherein said polar solvent is N-methylpyrrolidone.

5. A wire insulating varnish comprising a poly-(arylene-triketoimidazolidine) having the general formula:

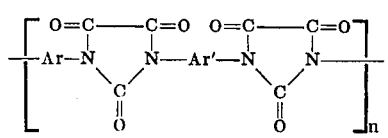

wherein Ar is an arylene group selected from the group consisting of unsubstituted and alkyl-substituted 4, 4'-diphenylmethane; 3, 3'-diphenylmethane; 4, 4'-diphenyl oxide; 4, 4'-diphenyl sulfone; 1, 5-naphthalene; and p-phenylene, Ar' is selected from the same group as Ar and m-phenylene, and n is a positive integer, an ester resin of terephthalic or isophthalic acid, ethylene glycol and at least one higher polyfunctional alcohol, and an inert polar organic solvent, said wire insulating varnish containing approximately 30 parts by weight of said poly-(arylenetriketoimidazolidine) per approximately 35 parts by weight of said ester resin.

6. The varnish of claim 5, wherein said polar solvent is cresol.

7. A process for the preparation of a poly-(arylenetriketoimidazolidine) which comprises reacting a bis(oxalic acid-monoalkyl ester-monoamide) of an aromatic diamine having the amino groups on two different benzene rings or para-positioned amino groups on the same benzene ring with an approximately equimolar amount of an aromatic diisocyanate in an inert polar organic solvent at a temperature between that at which the corresponding alkanol cleavage commences and the decomposition temperature of said bis-(oxalic acid-monoalkyl ester-monoamide), the alkanol cleaved during the reaction being removed from the reaction mixture, and recovering the resultant polymer.

8. The process of claim 7, wherein said bis (oxalic acid-monoalkyl ester-monoamide) is obtained by reacting an aromatic diamine having the amino groups on two different benzene rings or para-positioned amino groups on the same benzene ring with an excess amount of a dialkyl oxalate.

9. The process of claim 8, wherein said dialkyl oxalate is diethyl oxalate.

10. The process of claim 7, wherein said aromatic diisocyanate is selected from the group consisting of 2,4- and 2,6-diisocyanatotoluene, 4,4'-diisocyanatodiphenylmethane, 1,4-diisocyanatobenzene and 1,5-diisocyanatonaphthalene.

11. The process of claim 7, wherein said polar solvent is N-methylpyrrolidone and the reaction is carried out at a temperature of at least about 160°–170° C.

12. The process of claim 7, wherein said polar solvent is cresol and the reaction is carried out at a temperature of at least about 190°–195° C.

13. The process of claim 7, wherein a small excess of diisocyanate is employed, resulting in the production of polymers having terminal isocyanate or urethane groups, and wherein these terminal groups are then converted into urea moieties.

14. The process of claim 13, wherein the conversion into urea moieties is effected by adding water or a diamine to the reaction mixture.

15. The process of claim 7, wherein the reactants are 4,4'-diaminodiphenylmethane, diethyl oxalate and 4,4'-diisocyanatodiphenylmethane.

16. The process of claim 7, wherein the reactants are diaminodiphenyl oxide, diethyl oxalate and 1,5-diisocyanatonaphthatlene.

17. The process of claim 7, wherein the reactants are diaminodiphenylmethane, diethyl oxalate and toluylene diisocyanate.

18. The process of claim 7, wherein the reactants are diaminodiphenylsulfone, diethyl oxalate and 2,4-toluylene diisocyanate.

19. The process of claim 7, wherein the reactants are diaminodiphenylmethane-p-phenylenediamine (1:1 molar ratio), diethyl oxalate and 4,4'-diisocyanatodiphenylmethane.